United States Patent
Kim et al.

(10) Patent No.: US 12,440,705 B2
(45) Date of Patent: Oct. 14, 2025

(54) ULTRASOUND APPARATUS WITH RECIPROCATING TRANSFER WAY OF TRANSDUCER

(71) Applicant: VIOL CO., LTD., Seongnam-si (KR)

(72) Inventors: Ju Hwan Kim, Gwangmyeong-si (KR); Sangjin Lee, Anyang-si (KR)

(73) Assignee: VIOL CO., LTD., Seongnam-si (KR)

( * ) Notice: Subject to any disclaimer, the term of this patent is extended or adjusted under 35 U.S.C. 154(b) by 107 days.

(21) Appl. No.: 18/266,120

(22) PCT Filed: Nov. 2, 2021

(86) PCT No.: PCT/KR2021/015730
§ 371 (c)(1),
(2) Date: Jun. 8, 2023

(87) PCT Pub. No.: WO2022/124578
PCT Pub. Date: Jun. 16, 2022

(65) Prior Publication Data
US 2024/0091566 A1    Mar. 21, 2024

(30) Foreign Application Priority Data

Dec. 11, 2020 (KR) .................. 10-2020-0173686
Feb. 19, 2021 (KR) .................. 10-2021-0022789

(51) Int. Cl.
*A61N 7/02*    (2006.01)

(52) U.S. Cl.
CPC ........................ *A61N 7/02* (2013.01)

(58) Field of Classification Search
CPC ............. A61N 7/02; A61N 2007/0008; A61N 2007/0082; A61N 2007/0091; A61N 2007/0095; A61N 7/00; A61B 2034/2059; A61B 2090/065

See application file for complete search history.

(56) References Cited

U.S. PATENT DOCUMENTS

| | | |
|---|---|---|
| 2005/0187495 A1 | 8/2005 | Quistgaard et al. |
| 2016/0001097 A1 | 1/2016 | Cho et al. |
| 2017/0303895 A1 | 10/2017 | Park et al. |

(Continued)

FOREIGN PATENT DOCUMENTS

| | | |
|---|---|---|
| CA | 2726812 | 12/2009 |
| CN | 104367340 | 2/2015 |
| CN | 109853764 | 6/2019 |

(Continued)

OTHER PUBLICATIONS

EPO, Search Report of EP 21903625.8 dated Sep. 26, 2024.
EPO, Search Report of EP 21903644.9 dated Nov. 19, 2024, total 23 pages.

*Primary Examiner* — Hien N Nguyen
(74) *Attorney, Agent, or Firm* — LEX IP MEISTER, PLLC

(57) ABSTRACT

An ultrasonic device according to the present disclosure includes a cartridge comprising a transducer configured to generate ultrasonic waves, and a moving device configured to move the transducer, in which the moving device includes a moving main body, a moving block positioned on the moving main body and connected to the transducer and configured to move with the transducer, a moving connection member connected to the moving block, and a screw unit engaged with the moving connection member to allow the moving block to reciprocate, in which the screw unit has a bidirectional screw thread.

8 Claims, 5 Drawing Sheets

(56) References Cited

U.S. PATENT DOCUMENTS

2018/0055478 A1 3/2018 Choi et al.
2019/0366129 A1 12/2019 Park

FOREIGN PATENT DOCUMENTS

| | | |
|---|---|---|
| CN | 209364502 | 9/2019 |
| JP | S63-145052 | 9/1988 |
| JP | 2007-516810 | 6/2007 |
| JP | 2018-500075 | 1/2018 |
| JP | 2020-505116 | 2/2020 |
| JP | 2021-194537 | 12/2021 |
| KR | 20070029383 | 3/2007 |
| KR | 10-0750719 | 8/2007 |
| KR | 10-1188930 | 10/2012 |
| KR | 10-1191347 | 10/2012 |
| KR | 10-2014-0138030 | 12/2014 |
| KR | 10-2016-0026326 | 3/2016 |
| KR | 10-2016-0073603 | 6/2016 |
| KR | 20-2016-0002847 | 8/2016 |
| KR | 10-1700334 | 1/2017 |
| KR | 10-2017-0048911 | 5/2017 |
| KR | 10-1756618 | 7/2017 |
| KR | 10-1793253 | 11/2017 |
| KR | 10-2018-0015095 | 2/2018 |
| KR | 101964257 | 4/2019 |
| KR | 10-2094444 | 3/2020 |
| KR | 10-2111103 | 5/2020 |
| KR | 20200085449 | 7/2020 |
| WO | 2014055708 | 4/2014 |
| WO | 2018-143544 | 8/2018 |

ULTRASOUND APPARATUS WITH RECIPROCATING TRANSFER WAY OF TRANSDUCER

TECHNICAL FIELD

The present disclosure relates to an ultrasonic device, and more particularly to an ultrasonic device that uses high-intensity focused ultrasonic waves and employs a reciprocating motion method of a transducer.

BACKGROUND ART

In recent years, a variety of procedures have been developed for skin aesthetics and obesity treatment, and there has been a growing interest in procedures that are performed by non-invasive method.

Ultrasonic devices have been widely used for non-invasive procedures, and ultrasonic devices that utilize high-intensity focused ultrasonic waves (HIFU) have recently become popular. For example, ultrasonic devices are being developed to non-invasively perform cosmetic procedures such as face lifting or skin tightening by directing high-intensity focused ultrasound into the skin tissue, or to non-invasively treat obesity by directing high-intensity focused ultrasonic waves into the subcutaneous fat layer to non-invasively burn, melt, and break down fatty tissue.

The high-intensity focused ultrasonic device used in procedures for skin aesthetics includes an image monitor, an ultrasonic control unit, and a hand piece, the hand piece being coupled to a cartridge containing a transducer that generates ultrasonic waves.

Such an ultrasonic device is a structure in which a transducer that generates ultrasonic waves makes a reciprocating linear motion by rotating a screw unit with a screw thread in one direction in the forward and reverse directions. In this case, a deceleration section before the change of direction and an acceleration section after the change of direction are required to control the rotation direction of a driving motor, resulting in unnecessary traveling sections and increasing the time required for reciprocating motion.

DISCLOSURE

The present disclosure aims to provide an ultrasonic device that reduces the time required for reciprocating motion and has a simple control of a driving motor.

An ultrasonic device employing a reciprocating motion method of a transducer according to the present disclosure, the ultrasonic device including a cartridge comprising a transducer configured to generate ultrasonic waves, and a moving device configured to move the transducer, in which the moving device includes a moving main body, a moving block positioned on the moving main body and connected to the transducer and configured to move with the transducer, a moving connection member connected to the moving block, and a screw unit engaged with the moving connection member to allow the moving block to reciprocate, in which the screw unit has a bidirectional screw thread.

The bidirectional screw thread may include: a first screw thread formed on a surface of the screw unit along a first oblique direction; a second screw thread formed on the surface of the screw unit along a second oblique direction that crosses the first oblique direction; and a connecting screw thread configured to connect the first screw thread to the second screw thread.

The connecting screw thread may include: a first connecting screw thread formed on one side of the screw unit; and a second connecting screw thread formed on the other side of the screw unit.

The moving connection member may be inserted into the bidirectional screw thread and travels along the bidirectional screw thread.

The moving connection member may include: an insertion portion inserted into the bidirectional screw thread; and a connection portion connected to the insertion portion and engaged with the moving block.

A traveling direction of the moving block may be changed from a first direction to a second direction that is opposite to the first direction after the moving connection member passes through the first connecting screw thread, and the traveling direction of the moving block may be changed from the second direction to the first direction after the moving connection member passes through the second connecting screw thread.

The moving device further may include: a driving motor configured to provide driving power to the screw unit; and a pair of guide members connected to the moving block and configured to guide the moving block to reciprocate.

The moving device is installed on the moving main body and may further include a motion sensor configured to detect a motion of the moving block.

The cartridge may further include a pressure sensor installed at a lower end of the cartridge and configured to measure pressure applied externally.

Advantageous Effect

The ultrasonic device according to an embodiment of the present disclosure may allow the moving block 222 to reciprocate in the first direction and the second direction without changing the rotational direction of the screw unit by forming the bidirectional screw thread on the screw unit. Therefore, since a deceleration section before the change of direction of the moving block and an acceleration section after the change of direction of the moving block are not required, unnecessary traveling sections may be minimized, thereby minimizing the time required for reciprocating motion.

In addition, since the driving motor may rotate the screw unit in one direction to allow the moving block to reciprocate, a separate control device for changing the direction of rotation of the driving motor is not required.

MODE FOR INVENTION

Hereinafter, embodiments of the present disclosure will be described in detail with reference to the accompanying drawings so that those with ordinary skill in the art to which the present disclosure pertains may easily carry out the embodiments. The present disclosure may be implemented in various different ways, and is not limited to the embodiments described herein.

Figure 1:
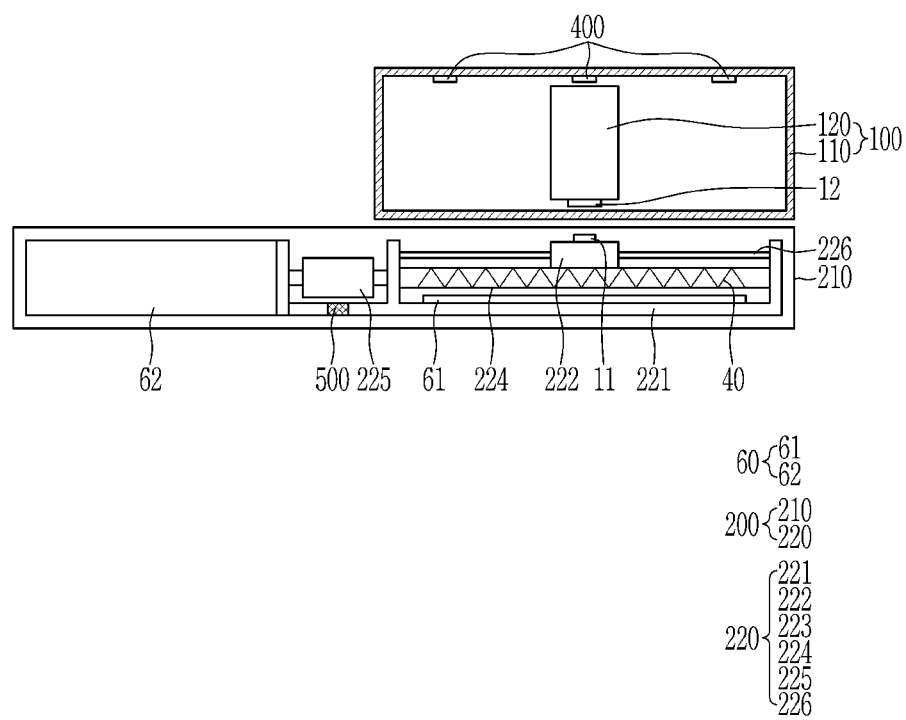
FIG. 1 is a schematic cross-sectional view of an ultrasonic device according to an embodiment of the present disclosure.
Figure 2:
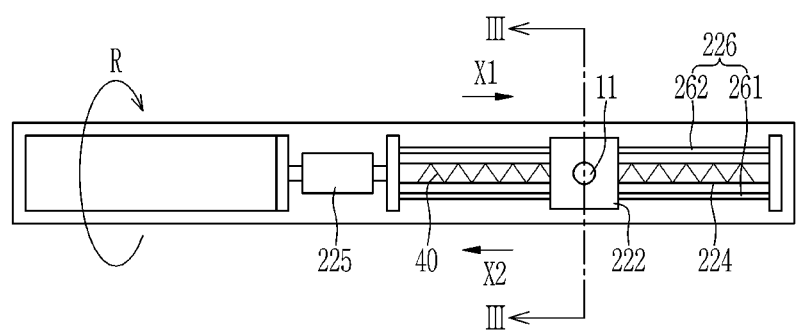
FIG. 2 is a top plan view of a moving device of the ultrasonic device according to an embodiment of the present disclosure.
Figure 3:
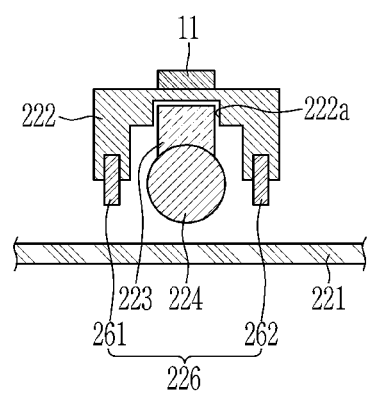
FIG. 3 is a cross-sectional view taken along line III-Ill in FIG. 2.

FIG. 1 is a schematic cross-sectional view of an ultrasonic device according to an embodiment of the present disclosure, FIG. 2 is a top plan view of a moving device of the ultrasonic device according to an embodiment of the present disclosure, and FIG. 3 is a cross-sectional view taken along line III-Ill in FIG. 2.

As illustrated in FIGS. 1 to 3, an ultrasonic device according to an embodiment of the present disclosure includes a cartridge 100 including a transducer 120 that irradiates a person to be treated with HIFU, and a hand piece 200 configured to adjust a treatment range in which the person to be treated is irradiated with HIFU.

The cartridge 100 may include a cartridge main body 110, and the transducer 120 that generates ultrasonic waves.

The transducer 120 may be installed inside the cartridge main body 110. The transducer 120 may irradiate and treat the person to be treated with HIFU.

The hand piece 200 may include a hand piece main body 210, and a moving device 220 that is installed within the hand piece main body 210 and moves the transducer 120.

The hand piece body 210 has a roughly cuboidal shape, but is not necessarily limited thereto, and various other shapes are possible.

The moving device 220 may include a moving main body 221, a moving block 222, a moving connection member 223 (see FIG. 3), a screw unit 224, a driving motor 225, and a pair of guide members 226.

The moving main body 221 may support the moving block 222, the moving connection member 223, and the screw unit 224.

The moving block 222 is positioned on the moving main body 221 and is connected to the transducer 120 so that the moving block 222 may move together with the transducer 120. A first magnetic member 11 may be installed on an upper portion of the moving block 222.

The moving connection member 223 may connect the moving block 222 and the screw unit 224.

The screw unit 224 is engaged with the moving connection member 223 so that the moving block 222 may be reciprocated by rotation of the screw unit 224. The screw unit 224 may have a bidirectional screw thread 40.

Figure 4:
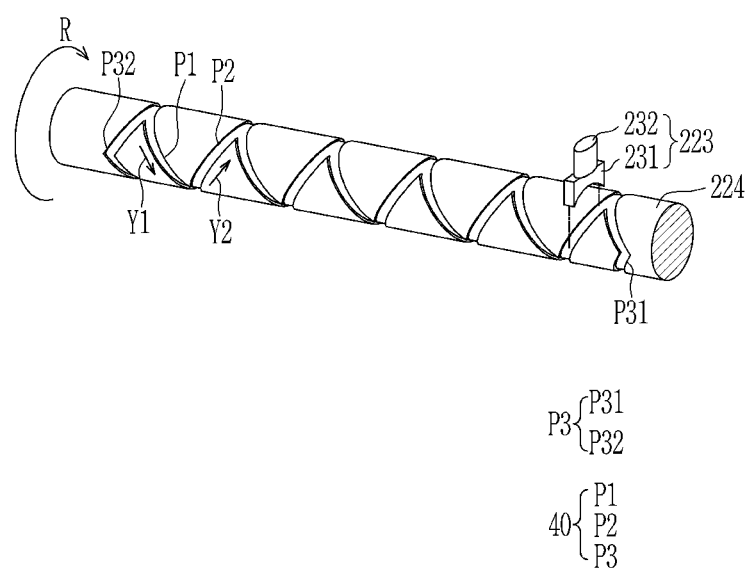
FIG. 4 is a perspective view illustrating a state in which a moving connection member is coupled to a screw unit of the ultrasonic device according to an embodiment of the present disclosure.
Figure 5:
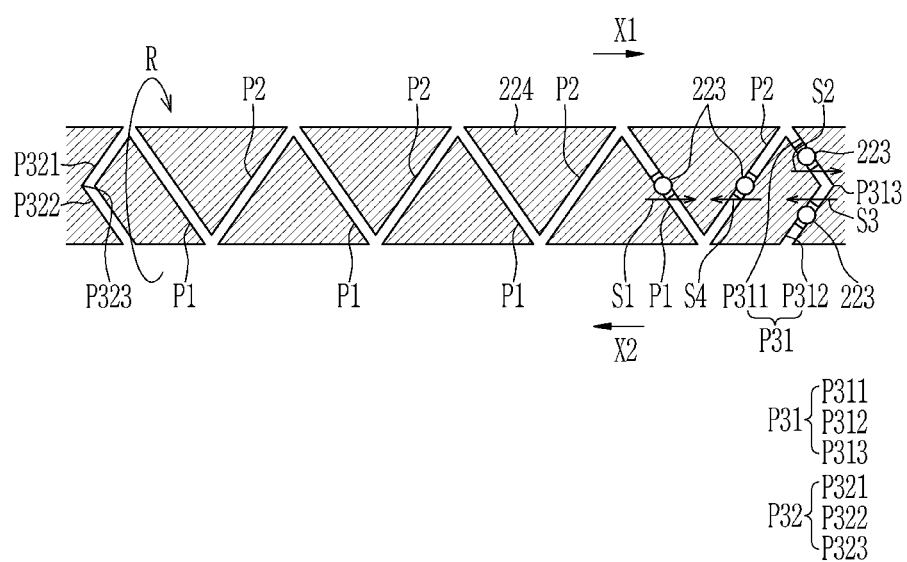
FIG. 5 is a view explaining a state in which the moving connection member moves according to a rotation of the screw unit of the ultrasonic device according to an embodiment of the present disclosure.

FIG. 4 is a perspective view illustrating a state in which the moving connection member is coupled to the screw unit 224 of the ultrasonic device according to an embodiment of the present disclosure, and FIG. 5 is a view explaining a state in which the moving connection member moves according to the rotation of the screw unit of the ultrasonic device according to an embodiment of the present disclosure.

As illustrated in FIGS. 4 and 5, the bidirectional screw thread 40 may include a first screw thread P1 formed on a surface of the screw unit 224 along a first oblique direction Y1, a second screw thread P2 formed on the surface of the screw unit 224 along a second oblique direction Y2 that intersects the first oblique direction Y1, and a connecting screw thread P3 that connects the first screw thread P1 and the second screw thread P2.

Further, the connecting screw thread P3 may include a first connecting screw thread P31 formed on one side of the screw unit 224, and a second connecting screw thread P32 formed on the other side of the screw unit 224. In this case, the first connecting screw thread P31 may include a first sub-connecting screw thread P311, a second sub-connecting screw thread P312 that crosses the first sub connecting screw thread P311, and a first direction changing screw thread P313 that connects the first sub-connecting screw thread P311 and the second sub-connecting screw thread P312 and changes directions.

Similarly, the second connecting screw thread P32 may include a third sub-connecting screw thread P321, a fourth sub-connecting screw thread P322 that crosses the third sub connecting screw thread P321, and a second direction changing screw thread P323 that connects the third sub-connecting screw thread P321 and the fourth sub-connecting screw thread P322 and changes directions.

The moving connection member 223 is inserted into the bidirectional screw thread 40 and may travel along the bidirectional screw thread 40. The moving connection member 223 may include an insertion portion 231 that is inserted into the bidirectional screw thread 40, and a connection portion 232 that is connected to the insertion portion 231 and engaged with a block groove 222a of the moving block 222. As the moving connection member 223 moves, the moving block 222 engaged with the moving connection member 223 also moves together, and as the moving block 222 moves, the transducer 120 magnetically coupled to the moving block 222 also moves together. In this case, a first magnetic member 11 installed on an upper portion of the moving block 222 is magnetically coupled with a second magnetic member 12 installed on a lower portion of the transducer 120.

As illustrated in FIG. 5, when the screw unit 224 is rotated in one direction R by the driving motor 225, the moving connection member 223 inserted into the first screw thread P1 travels in a first direction X1 (S1).

Subsequently, when the screw unit 224 is rotated in one direction R, the moving connection member 223 is positioned on the first sub-connecting screw thread P311 formed on one side of the screw unit 224. The moving connection member 223 inserted into the first sub-connecting screw thread P311 travels in the first direction X1 according to the rotation of the screw unit 224 (S2).

Then, when the screw unit 224 is rotated in one direction, the moving connection member 223 passes through the first direction changing screw thread P313 connected to the first sub-connecting screw thread P311 and is positioned on the second sub-connecting screw thread P312. The moving connection member 223 positioned on the second sub-connecting screw thread P312 travels in the second direction X2, which is opposite to the first direction X1, according to the rotation of the screw unit 224 (S3). As described above, the moving connection member 223 passes through the first direction changing screw thread P313, and a traveling direction of the moving connection member 223 may be changed from the first direction X1 to the second direction X2.

That is, after the moving connection member 223 subsequently travels through the first connecting screw thread P31, that is, the first sub-connecting screw thread P311, the first direction changing screw thread P313, and the second sub-connecting screw thread P312, a traveling direction of the moving block 222 may be changed from the first direction X1 to the second direction X2.

Subsequently, when the screw unit 224 rotates in one direction R, the moving connection member 223 inserted into the second screw thread P2 connected to the second sub-connecting screw thread P312 travels in the second direction X2 (S4).

Similarly, when the screw unit 224 is rotated in one direction R, after the moving connection member 223 subsequently travels through the second connecting screw thread P32 formed on the other side of the screw unit 224, that is, the third sub-connecting screw thread P321, the second direction changing screw thread P323, and the fourth sub-connecting screw thread P322, the traveling direction of the moving block 222 may be changed from the second direction X2 back to the first direction X1.

As described above, the ultrasonic device according to an embodiment of the present disclosure may allow the moving block 222 to reciprocate in the first direction X1 and the second direction X2 without changing the rotational direction of the screw unit 224 by forming the bidirectional screw thread 40 on the screw unit 224. Therefore, since a deceleration section before the change of direction of the moving block 222 and an acceleration section after the change of direction of the moving block 222 are not required, unnecessary traveling sections may be minimized, thereby minimizing the time required for reciprocating motion.

As illustrated in FIG. 2, the driving motor 225 may provide a driving force to the screw unit 224 to rotate the screw unit 224 in one direction R, thereby allowing the moving block 222 to reciprocate. As described above, since the driving motor 225 may rotate the screw unit 224 in one direction to allow the moving block 222 to reciprocate, a separate control device for changing the direction of rotation of the driving motor 225 is not required.

The pair of guide members 226 penetrate the moving block 222 and may guide the moving block 222 to reciprocate along the first direction X1 and the second direction X2. The pair of guide members 226 may include a first guide member 261 and a second guide member 262 positioned on both sides of the screw unit 224, respectively.

The moving device 220 may further include a position control unit 60 that controls a position of the moving block 222 that reciprocates in the first direction X1 and the second direction X2. The position control unit 60 may include a position determining portion 61 installed on the moving main body 221 corresponding to the screw unit 224, and an encoder 62 installed on the driving motor 225. The position determining portion 61 may include a variable resistor that determines the position of the moving block 222 based on a difference in electrical resistance, or a photo sensor that determines the position of the moving block 222 based on a difference in light intensity.

Meanwhile, the cartridge 100 of the ultrasonic device according to an embodiment of the present disclosure may further include a pressure sensor 400.

The pressure sensor 400 may be installed at a lower end of the cartridge 100, that is, at a lower end of the cartridge main body 110, to measure externally applied pressure.

Ultrasonic devices in the related art have a treatment depth of 1 to 5 mm, depending on a position of the transducer inside the cartridge. However, because depth of the treatment may be deeper or shallower, depending on pressure by which an operator presses the cartridge with the hand piece against a treatment area, the depth of the treatment becomes inconsistent since the treatment effectiveness is determined by the operator's skill level.

However, by installing the pressure sensor 400 at the lower end of the cartridge 100, the ultrasonic device according to the present embodiment may measure the pressure of the hand piece applied to the treatment area and, when the correct pressure is applied, may use light or sound to make the operator recognize the pressure of the hand piece. Therefore, the same treatment effect may be achieved regardless of the operators skill level.

The moving device 220 may further include a motion sensor 500. The motion sensor 500 is installed on the moving main body 221 and may detect a motion of the moving block 222.

In ultrasonic devices in the related art, the operator moves the hand piece to navigate the treatment area to apply ultrasonic waves to multiple treatment areas, but the movement to the treatment area cannot be accurately verified, so when the cartridge is not accurately moved to the treatment area, heat may be applied to the same area again, causing necrosis of the skin in the treatment area.

However, by installing the motion sensor 500 on the moving main body 221 of the hand piece 200, the ultrasonic device according to the present embodiment may perform the ultrasonic irradiation again when the movement to the treatment area is confirmed after the motion of the moving block 222 is detected. That is, after the treatment position of the moving block 222 is confirmed by the motion sensor 500, light or sound may be used to help the operator confirm an exact position of the treatment area. Therefore, the operator does not need to identify the position of the ultrasonic irradiation each time, and even when the ultrasonic device is operated in continuous mode, heat is not applied to the same treatment area, which can prevent necrosis of the skin in the treatment area.

The motion sensors 500 may include a gyro sensor, an accelerometer, a geomagnetic sensor, or the like.

While the present disclosure has been described with reference to the aforementioned exemplary embodiments, the person skilled in the art will easily understand that the present disclosure is not limited to the disclosed exemplary embodiments, but can be variously corrected and modified without departing from the scope of the appended claims.

The invention claimed is:
1. An ultrasonic device comprising:
a cartridge comprising a cartridge main body, and a transducer installed in the cartridge main body and configured to generate ultrasonic waves; and
a hand piece main body comprising a moving device configured to move the transducer,
wherein the moving device comprises:
a moving main body;
a moving block positioned on the moving main body and configured to be coupled to the transducer and move with the transducer;
a first magnetic member installed on the moving block;
a moving connection member connected to the moving block; and
a screw unit engaged with the moving connection member to allow the moving block to reciprocate, and provided with a bidirectional screw thread,
wherein the cartridge comprises a second magnetic member installed on the transducer,
wherein the transducer is configured to be magnetically coupled to the moving block by magnetically coupling the first magnetic member to the second magnetic member and move along with the moving block when the moving connection member moves, and
wherein the moving device in the hand piece main body is configured to be spatially separated from the transducer in the cartridge by separating the first magnetic member from the second magnetic member, wherein the bidirectional screw thread comprises
a first screw thread formed on a surface of the screw unit along a first oblique direction,
a second screw thread formed on the surface of the screw unit along a second oblique direction that crosses the first oblique direction, and
a connecting screw thread configured to connect the first screw thread to the second screw thread,
wherein the connecting screw thread comprises a first connecting screw thread formed on one side of the screw unit,
wherein the first connecting screw thread includes a first sub-connecting screw thread, a second sub-connecting screw thread crossing the first sub-connecting screw thread, and a first direction changing screw thread that connects the first sub-connecting screw thread and the second sub-connecting screw thread and changes directions, and
wherein the first sub-connecting screw thread and the second sub-connecting screw thread are connected to each other by the first direction changing screw thread that is bent at a predetermined angle.

2. The ultrasonic device of claim 1, wherein:
the connecting screw thread further comprises:
a second connecting screw thread formed on the other side of the screw unit.

3. The ultrasonic device of claim 1, wherein:
the moving connection member is inserted into the bidirectional screw thread and travels along the bidirectional screw thread.

4. The ultrasonic device of claim 3, wherein:
the moving connection member comprises:
an insertion portion inserted into the bidirectional screw thread; and
a connection portion connected to the insertion portion and engaged with the moving block.

5. The ultrasonic device of claim 3, wherein:
a traveling direction of the moving block is changed from a first direction to a second direction that is opposite to the first direction after the moving connection member passes through the first connecting screw thread, and
the traveling direction of the moving block is changed from the second direction to the first direction after the moving connection member passes through the second connecting screw thread.

6. The ultrasonic device of claim 1, wherein:
the moving device further comprises:
a driving motor configured to provide driving power to the screw unit; and
a pair of guide members connected to the moving block and configured to guide the moving block to reciprocate.

7. The ultrasonic device of claim 1, wherein:
the moving device is installed on the moving main body and further comprises a motion sensor configured to detect a motion of the moving block.

8. The ultrasonic device of claim 1, wherein:
the cartridge further comprises a pressure sensor installed at a lower end of the cartridge and configured to measure pressure applied externally.

* * * * *